United States Patent Office.

JAMES H. SPERLING, OF PERU, INDIANA.

Letters Patent No. 65,840, dated June 18, 1867.

---

IMPROVED MEDICAL COMPOUND.

---

The Schedule referred to in these Letters Patent and making part of the same.

---

Be it known that I, JAMES H. SPERLING, of Peru, in the county of Miami, and State of Indiana, have invented a new and improved Medical Compound, or medicine, for the cure of intermittent fever, or fever and ague; and I do hereby declare that the following is a full and exact description thereof, combined in the proportions designated:

Two drachms of nitre or saltpetre; one and one-half drachm of gum camphor; ten grains cayenne pepper.

To enable others skilled in the art to make and use said medicinal compound or medicine, I take the above ingredients, and thoroughly pulverize and mix the same, and place the same in a small sack of silk or other thin material, and apply it to the pit of the stomach about two hours before the time for the chill, and keep it carefully bandaged in that position not less than four hours. For children, one-half of the above quantity will be sufficient.

What I claim as my invention, and desire to secure by Letters Patent, is—

The combination of said ingredients in the proportions designated substantially, and applied in the manner set forth.

JAMES H. SPERLING.

Witnesses:
R. B. RUNYAN,
JAS. N. FYNER.